United States Patent
Cohen et al.

(10) Patent No.: US 7,571,848 B2
(45) Date of Patent: Aug. 11, 2009

(54) DECENTRALIZED SYSTEM AND METHOD FOR THE REMOTE CAPTURE, PROCESSING AND TRANSMISSION OF CHECK 21™ COMPLIANT CHECKING DOCUMENT INFORMATION

(75) Inventors: Lawrence Cohen, Lighthouse Point, FL (US); Jeryl Lederman, Parkland, FL (US); Patrick Krug, Miami, FL (US); Stephen Rosenbaum, Boca Raton, FL (US)

(73) Assignee: Skyline Data, Inc., Deerfield Beach, FL (US)

( * ) Notice: Subject to any disclaimer, the term of this patent is extended or adjusted under 35 U.S.C. 154(b) by 391 days.

(21) Appl. No.: 11/357,488

(22) Filed: Feb. 18, 2006

(65) Prior Publication Data

US 2007/0194102 A1    Aug. 23, 2007

(51) Int. Cl.
 *G07F 19/00* (2006.01)
(52) U.S. Cl. .................. 235/379; 235/375; 705/35
(58) Field of Classification Search ............. 235/379, 235/487, 375; 705/35
See application file for complete search history.

(56) References Cited

U.S. PATENT DOCUMENTS

| 7,181,430 B1* | 2/2007 | Buchanan et al. ............ 705/45 |
| 7,246,741 B2* | 7/2007 | Cable et al. ................ 235/379 |
| 2006/0184441 A1* | 8/2006 | Haschka et al. ............. 705/35 |
| 2007/0086642 A1* | 4/2007 | Foth et al. .................. 382/137 |

\* cited by examiner

*Primary Examiner*—Seung H Lee
(74) *Attorney, Agent, or Firm*—Gold & Rizvi, P.A.; Glenn E. Gold; H. John Rizvi (57) ABSTRACT

A de-centralized, or non-centralized, system and method facilitates the capture and processing of checks and related bank document information at a remote client subsystem and locally processing the checks and information at the remote client site, for transmission to a main subsystem, for direct routing of the bank document information to the U.S. Federal Reserve Bank, circumventing intermediate transmission to the Bank of First Deposit (BOFD), all in compliance with the Check Clearing for the 21st Century Act.

20 Claims, 3 Drawing Sheets

DECENTRALIZED SYSTEM AND METHOD FOR THE REMOTE CAPTURE, PROCESSING AND TRANSMISSION OF CHECK 21™ COMPLIANT CHECKING DOCUMENT INFORMATION

BACKGROUND OF THE INVENTION

1. Field of the Invention

The present invention relates generally to financial institution document processing. More specifically, the invention relates to a non-centralized, or decentralized, system and method that facilitates the capture, processing and archiving of checks and related financial institution document information at a remote merchant site, and enables direct transmission of the information to a U.S. Federal Reserve Bank, circumventing intermediate transmission to the Bank of First Deposit, all in compliance with the Check Clearing for the 21st Century Act.

2. Description of the Prior Art

The Check Clearing for the 21st Century Act, commonly referred to as "Check 21," was signed into law on Oct. 28, 2003, and became effective on Oct. 28, 2004. Check 21 was designed to foster innovation in the payments system and to enhance its efficiency by reducing some of the legal impediments to check truncation. The law facilitates check truncation by creating a new negotiable instrument called a "substitute check," which permits banks to truncate original checks, to process check information electronically, and to deliver substitute checks to banks that want to continue receiving paper checks. A substitute check is the legal equivalent of the original check and includes all the information contained on the original check.

Check 21 has clearly made check processing more efficient. Instead of physically moving paper checks from one bank to another, Check 21 has allowed banks to process more checks electronically. Banks capture a picture of the front and back of the check along with the associated payment information and transmit this information electronically. If a receiving bank or its customer requires a paper check, the bank can use the electronic picture and payment information to create a paper substitute check. This process was created to enable banks to reduce the cost of physically handling and transporting original paper checks, which can be very expensive. Substitute checks are a paper copy of the front and back of the original check, which is printed in accordance with very specific standards so that the substitute check can be used in the same way as the original check.

While Check 21 has improved the efficiency of check processing, providing some additional level of convenience for banks and their customers, it has not translated into drastic financial savings for bank customers.

Systems and methods for the centralized high-speed processing of documents, such as bank checks, including high speed capturing, processing, transmission and storage, of video image data from the documents, is well known in the prior art. For example, U.S. Pat. Nos. 4,888,812 (to Dinan et al.) and 6,644,546 (to George et al.), both assigned to International Business Machines (IBM) of Armonk, N.Y., clearly describe such systems and methods. U.S. Pat. Nos. 5,862,321 (to Lamming et al.) and 6,144,997 (to Lamming et al.), both assigned to Xerox Corporation of Stamford, Conn., provide further examples of existing centralized systems and methods for accessing and distributing electronic documents.

Technology for check image capturing, performing optical character recognition (OCR) and image assessment, is well known in the art. For example, U.S. Pat. Nos. 5,097,517; 5,208,869; 5,444,794; 5,602,936; and 6,408,094 clearly describe such technology. This technology is conventionally used, for example, to process bank checks having Magnetic Ink Character Recognition (MICR) numbers. A magnetic ink reader is used with an MICR number that appears at the bottom of a bank check, bank draft, or bank deposit slip in order to establish and individual bank, account number, check number and a check or deposit slip amount. Furthermore, U.S. Patent Publication Nos. 2005/0144131 and 2005/0252960 describe associated centralized methods for electronically transmitting checks between financial institutions, such as between an Originating Depository Financial Institution (ODFI) and a Receiving Banking Financial Institution (RDFI).

Existing Check 21 solutions take advantage of the combination of prior scanning, imaging, processing and centralized electronic transmission technologies, in conjunction with Check 21 laws, to deliver Check 21 compliant data from remote merchant sites to the merchant's bank, or the Bank of First Deposit (BOFD), where the checks are processed as if physically delivered to the bank. However, applicants are unaware of any such system or method which enables the business merchants to locally capture and process Check 21 compliant data, for subsequent transmission to the Federal Reserve Bank, from a remote merchant site, bypassing the BOFD's operations, yet still providing archival and compliance information to the BOFD.

Accordingly, what is needed is a system and method that enables merchants to process batches of checks locally, for direct transmission (i.e., bypassing the Bank of First Deposit's operations) of Check 21 compliant checks to the Federal Reserve Bank. It would be further desirable to provide such a system and method incorporating means, such as a rules engine, to separate Automated Clearing House (ACH) eligible checks and use least cost routing to process them via ACH. That is, to provide such a rules engine which automatically processes, via Check 21, those checks that are not eligible for ACH, such as corporate checks, and those checks from merchants desirous of processing checks exclusively via Check 21 (i.e., a system that can automatically determine whether to process a check by ACH or Check 21). It would be of further benefit to provide such a system and method that enables similar processing of checks that are accompanied by, and associated with, payment coupons, such as mortgage payment and lease payment coupons, for example.

BRIEF DESCRIPTION OF THE DRAWINGS

The preferred embodiments of the invention will hereinafter be described in conjunction with the appended drawing figure(s), provided to illustrate and not to limit the invention, in which.

DETAILED DESCRIPTION OF THE PREFERRED EMBODIMENTS

Referring to the accompanying drawing Figures, the present invention is generally directed to a system and method that enables merchants to process batches of checks locally, for transmission to the Federal Reserve Bank, bypassing the Bank Of First Deposit's (BOFD's) operations, entirely in compliance with Check 21 laws. The system incorporates software, a component of which comprises a rules engine to automatically determine whether to process individual checks from a check batch by Automated Clearing House (ACH) standards or, alternatively, in accordance with Check 21 standards.

Generally, conventional commercially available hardware is provided in a particular configuration at a commercial merchant location. The hardware typically includes any of a variety of commercially available scanning equipment attached to a personal computer having integral means for processing batches of paper checking documents or locally communicatively linked to such batch processing equipment. Alternatively, or in addition to the batch check processing equipment, check images can be provided to the merchant previously scanned and stored on a computer-readable media. In this case, where data is imported for remote processing at the local merchant site, local processing may entail performing an OCR operation; performing a scanning operation; performing both scanning and OCR operations; or performing OCR, scanning and MICR parsing operations.

Significantly, the check images comprise a legally substitutable electronic version of the original physical checking document in compliance with Check 21 laws. Scanned electronic images can be further processed utilizing Optical Character Recognition (OCR) and pattern recognition software running on either a local stand alone workstation or a local network server at the merchant's location. The scanned electronic images may be stored locally within an electronic database and image repository at the remote merchant location, which may also include a customer's office, a credit union office or another financial institution office. Software developed by the present inventors, particularly for use with the invention, runs on the merchant computer system to perform, in addition to or in combination with other processes, a process for verifying that each and every electronic check image is in conformance with Check 21 laws and is available for transmission to a Federal Reserve Bank branch, without requiring an intermediate step of transmission to a BOFD. In this manner, the system and methods of the present invention enable merchants to perform local on-site processing of batch checks, or imported batch check images, which are routed by the present system, for transmission to a Federal Reserve Bank for immediate processing.

In a further aspect of the invention, another system component can be provided to facilitate the determination of the terminal from which checks are received and whether or not each checks processed from that particular terminal are eligible for Automated Clearing House (ACH) network electronic check transfer processing. If so, the software enables batch information transmitted from the merchant terminal to determine/define whether a particular batch of checks are eligible for ACH. In the event that a check is received from an ACH eligible terminal and an ACH eligible batch, the MICR line, Payor bank routing and account numbers, check number, and an ACH exclusion data table, created by the proprietary software of the invention, are used to determine whether the individual check is ACH eligible. In accordance with this aspect of the invention, two sets of checks are developed; those eligible for ACH, and those not eligible for ACH. Those checks that are not eligible for ACH, whether commercial, from check batches not eligible for ACH or from terminals not eligible for ACH, are automatically processed in accordance with Check 21 and transmitted to the Federal Reserve Bank in secure form as X937 files.

Figure 1:
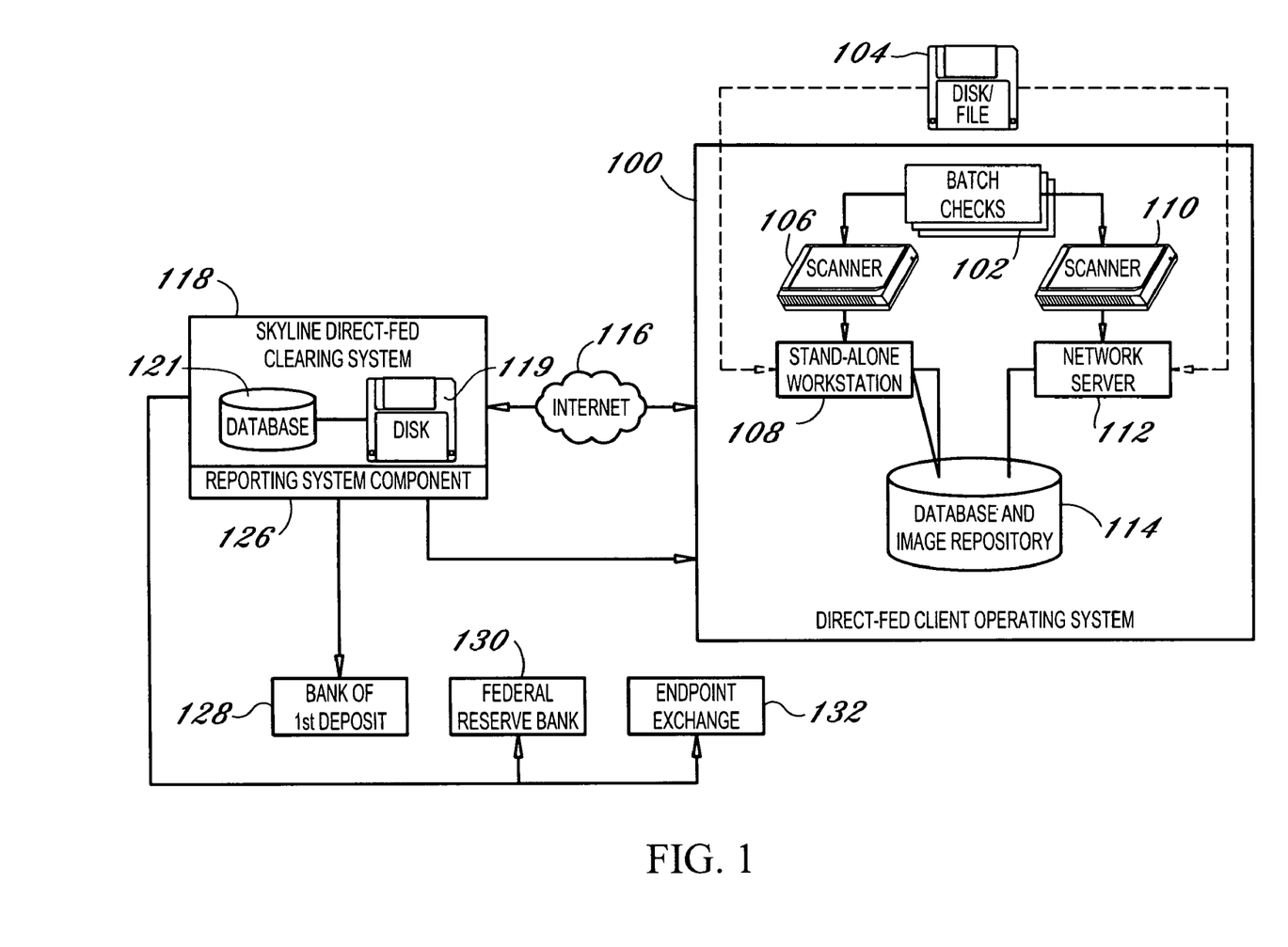
FIG. 1 is a block diagram of a system supporting a method for enabling merchants to process batches of checks locally, for transmission of Check 21 compliant checks to the Federal Reserve Bank, in accordance with the invention.

Referring initially to FIG. 1, a system 100, alternatively referred to herein as the DirectFed™ client system, is provided at a remote merchant location or site. The DirectFed™ client system 100, whose output files have received approval by the Federal Reserve Bank, operates in the following manner. DirectFed™ client software runs locally at a remote merchant location, either on a personal computer (PC) 108 acting as a stand alone workstation or, alternatively, on a networked PC 112, preferably running either a Microsoft Windows XP or Windows 2000 operating system. The DirectFed™ client software, run either on a standalone PC 108 or on a client's network 112, utilizes a common database and image repository 114. Accordingly, participating merchants maintain local archiving of the images, in contrast to conventional centralized systems, which typically maintain central system database archives. The network version allows for a sophisticated workflow design, whereby each PC on the network can be configured in such a way so as to perform all tasks associated with the DirectFed™ client software, or a subset of those tasks. The standalone remote computer 108, or at least one computer in the network environment 112, is equipped with, or is communicatively linked to, a respective scanner 106, 110. For convenience, all further descriptions and examples provided herein will reference a standalone computer.

The DirectFed™ system operates in batch mode, in which multiple checks 102 are processed in a single batch. The remote computer 108, equipped with scanner 106, includes a software scanning module which allows checks to be scanned front and back, the magnetic MICR line to be read, and a customized physical endorsement to be printed upon the back of each check. Once all of the checks 102 in a batch have been scanned, the check images, front side and back side, and the MICR information can be stored on disk or other removable storage medium (not shown). As an alternative to scanning a batch of checks at the remote merchant location 100, check images and MICR information can be imported in file 104 formats, from a system location residing outside of the merchant system 100. Consequently, remote processing at the local merchant site may comprise any of the following operations: (1) OCR; (2) Scanning or Image Capture; (3) OCR and Scanning; or (4) OCR, Scanning and MICR Parsing.

Figure 2:
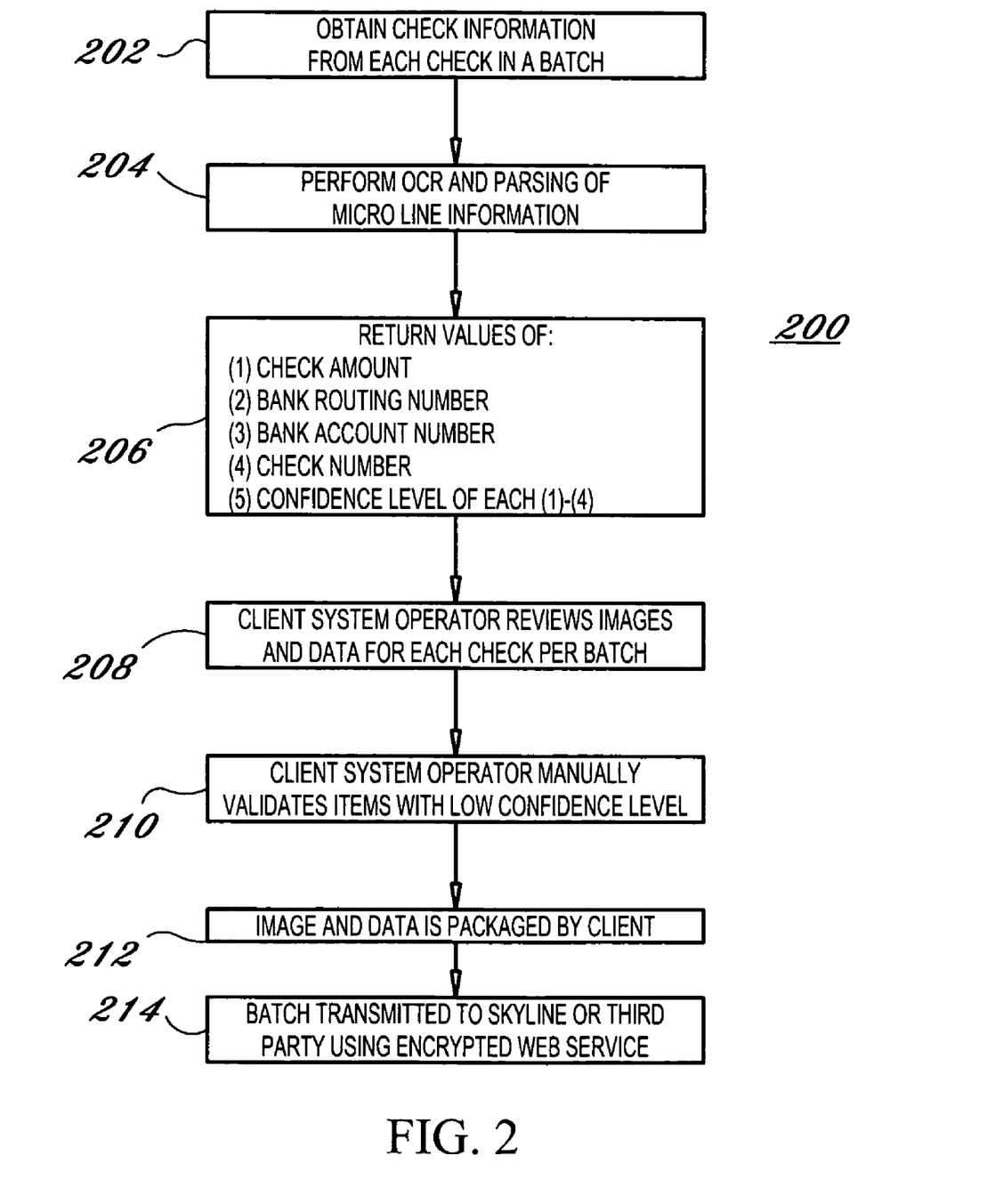
FIG. 2 is a flow diagram illustrating a method of batch check processing at a remote merchant location, in accordance with the present invention.

Referring now to FIGS. 1 and 2, at the conclusion of either the scanning or data importation process step 202, in step 204 another process is triggered which performs OCR as well as parsing of the MICR Line information. In a subsequent step 206, the OCR and parsing processes return value data, including: (1) check amount; (2) bank routing number; (3) bank account number; and (4) check number. Significantly, these processes also return quantitative measurements, or values, representing the confidence level of the accuracy of the OCR results pertaining to each of the respective pieces of data. Subsequently, in step 208, a remote operator at the local merchant site 100 reviews the images and data for each check in the batch. Significantly, the efficacy of this process is greatly enhanced by assigning color-coding in accordance with the respective confidence levels. Preferably, green, yellow and red colors are utilized to provide easy visual indication to the operator as to the confidence level attached to each data item. Subsequently, in step 210, and based upon a configuration setting in the profile that governs the particular batch, the operator is required to manually validate only those data items with a certain confidence level. Termed "Examination Rigor", this profile configuration value may be set to require that only low confidence data (i.e. marked red) need be inspected, or that both low and moderate confidence level data (i.e marked red or yellow) must be inspected, or that all data (i.e. even items marked green) must be inspected for errors. Upon completion of the review, the batch is ready for transmission to the DirectFed™ clearing system 118, or a like third party system. For convenience, all further description herein will refer to transmission to the DirectFed™ clearing system 118. In step 212, the image and data information is packaged at the client 100 for subsequent transmission, in step 214, to the DirectFed™ clearing system 118 via the Internet utilizing an encrypted web service.

Figure 3:
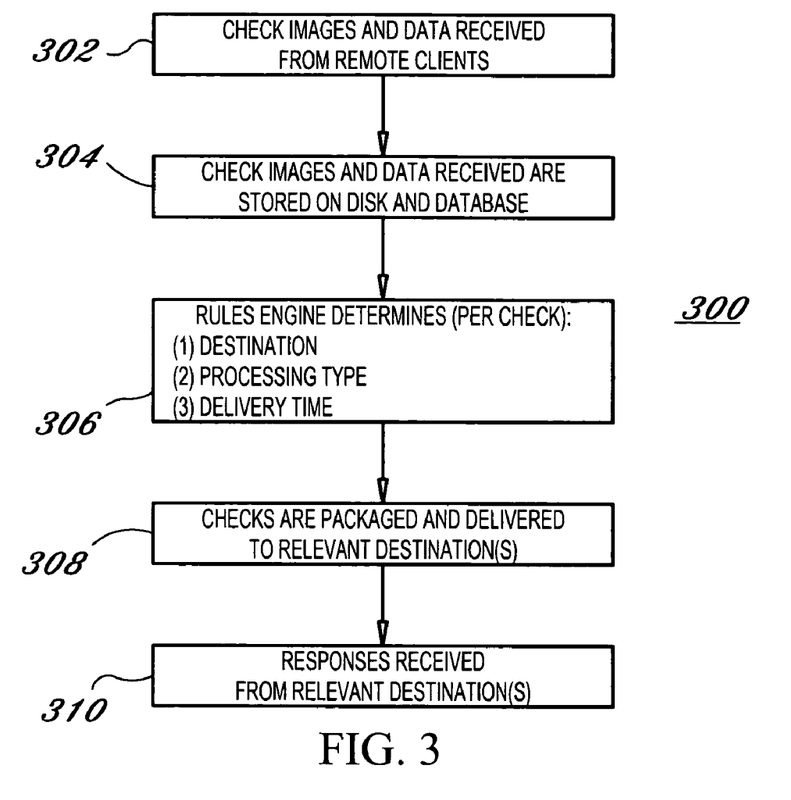
FIG. 3 is a flow diagram illustrating a method of batch check clearing, in accordance with the present invention.

Referring now primarily to FIGS. 1 and 3, as stated above, the DirectFed™ clearing system 118 operates remotely from the merchant system 100. Initially, in step 302, check images and data are received from remote clients via an encrypted web file transfer service. Subsequently, in step 304, the check images and data can be stored on disk 119, or other portable media, and/or in a database 121. However, because the data is archived locally by the merchant, centralized archiving is not necessary. Subsequently, in step 306, a rules engine determines destination, processing type and time of delivery information for each check. Subsequently, in step 308, the checks are packaged and delivered, preferably by secure electronic transmission, to one or more relevant destinations. Consequently, in contrast to prior art systems, for all intents and purposes, the DirectFed™ system 118 functions merely as a routing mechanism. The destination is primarily a Federal Reserve Bank 130, but could also comprise another clearing agent such as the Endpoint Exchange 132. Finally, in step 310, delivery responses received at the DirectFed™ clearing system 118, securely transmitted from the relevant destination(s), 130 and 132, provide confirmation of receipt. As previously stated, check processing types include Check 21 and ACH. Time of delivery is based upon deadlines imposed by the various destinations and check volume.

Figure 4:
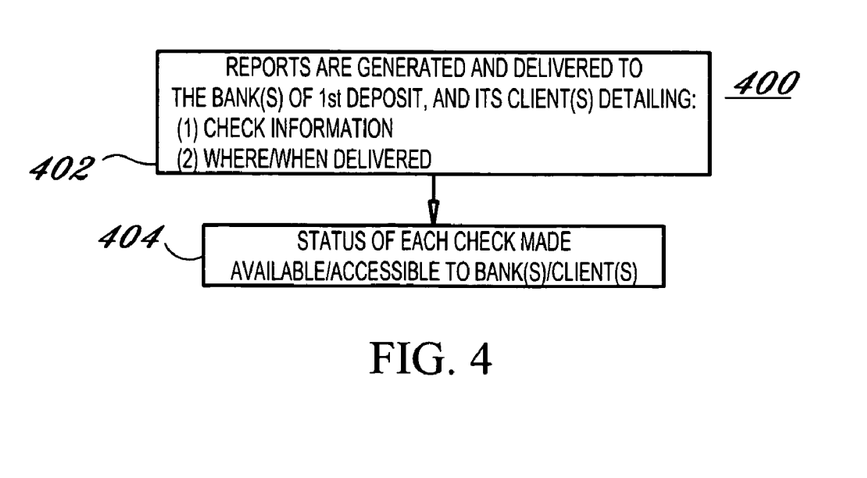
FIG. 4 is a flow diagram illustrating a method of data and information reporting, following batch check processing at a remote merchant location, in accordance with the present invention.

Referring now to FIGS. 1 and 4, the DirectFed™ clearing system 118 includes a Reporting System component 126, providing a reporting process 400. Initially, in step 402, reports are generated for delivery to the merchant, the merchant's BOFD 128 and/or a community bank's processor (for local archiving), via secure Internet 116 transmission. Reports preferably detail the check information, the timing and location of completed check deliveries, and processing type (i.e., Check 21 or ACH). Preferably, an Internet website operated from or by the DirectFed™ clearing system 118, enables financial institutions, merchants, and any other predetermined entity or party, to review the status of all checks uploaded to database 121, as well as any other desired related data or information.

The DirectFed™ system takes advantage of the new rules provided by the Check 21 act. It allows merchants to deposit checks without having to deliver the physical check to a bank. The DirectFed™ clearing system has been approved by the Federal Reserve Bank for the delivery of checks via the Check 21 system. The checks, preferably delivered/routed via a third party system, such as the DirectFed™ clearing system 118, are directly deposited with the Federal Reserve Bank 130 (or Endpoint Exchange 132), completely bypassing the BOFD 128. There are a host of benefits and advantages provided by the system and method of the present invention, including, for example, the following: (1) merchant employees do not have to leave the office to deposit checks; (2) manual deposit tickets do not have to be created; (3) photocopies of checks do not have to be created, since the images of the checks are retained and available on the client system; (4) for large volume deposits, armored guards/vehicles are not required, since the physical checks are never transported to the bank; (5) rather than having paper checks delivered to the bank and then manually processed at the bank, the check images are electronically delivered to the Federal Reserve Bank, or Endpoint Exchange, for credit to the BOFD, resulting in greatly expedited availability of funds; (6) due to the increased clearance speed, returns are processed faster, giving merchants a greater opportunity to recover funds; (7) upon request of the merchant, checks can be automatically separated into those eligible for ACH and those which are not eligible, so that ACH eligible checks can be processed by ACH and the others via Check 21, preventing the requirement of the merchant manually separating checks before processing via ACH. With the addition of coupon processing (further described herein below), or without coupon processing (depending upon the required data), automated import into client Accounts Receivable (A/R) and other systems can be easily accommodated. This can result in an enormous saving of time, and elimination of many common keyboard errors. The BOFD does not need to have a physical location near the remote merchant site. This allows a bank to expand the geographic coverage of its depositor. Similarly, a merchant with multiple locations can consolidate its accounts at a single bank, even for those locations that are not located near a bank branch. Banks that clear checks through other banks, or credit unions clearing through corporate credit unions, can bypass the intermediary and clear directly through the Federal Reserve Bank. This saves time and the cost of physically delivering the checks.

In contrast to systems and methods of the prior art, the system and methods of the present invention enable and facilitate deliver directly to the Federal Reserve Bank. Existing systems require delivery to the BOFD, which then processes the checks for clearance. Furthermore, the system and methods of the present invention enable automatic determination as to whether to process a check by ACH or Check 21. The DirectFed™ clearing system is capable of creating multiple Check 21 compliant X937 files, each file containing multiple cash letters and bundles. This allows delivery of checks for multiple banks to multiple Federal Reserve Banks for multiple accounts.

As previously stated and described above, the system and method of the invention determine the terminal from which checks are received, and whether checks from that terminal are eligible for ACH. If the terminal from which the batch is received is eligible for ACH, batch information transmitted from the client terminal determines whether the specific batch of checks is eligible for ACH. If a check from an ACH eligible terminal and ACH eligible batch is received the MICR line, Payor bank routing number, Payor bank account number, check number and Skyline Data system proprietary ACH exclusion data tables are used to determine whether the individual check is ACH eligible. The Payor bank routing number and Payor bank account number are used to determine whether specific banks or bank/routing number combinations are not ACH eligible. The MICR line and check number are used to determine whether the check is a commercial or personal check. Commercial checks are not ACH eligible. The result is two sets of checks, those eligible for ACH, and those not eligible for ACH. Checks not eligible for ACH, whether commercial, from batches not eligible for ACH, or from terminals not eligible for ACH, are processed via Check 21.

Checks processed via Check 21 are sent to the Federal Reserve Bank via secure transport. One or more X937 files are created as required. Each X937 file is created and delivered via secure transport to a specific branch of the Federal Reserve Bank. The rules engine is used to determine which branch of the Federal Reserve Bank to deliver a check to. The routing number of the BOFD is used to make this determination. Each X937 file for a specific Federal Reserve Bank branch is composed of one or more cash letters. The rules engine determines the number of cash letters in an X937 file based upon analysis of the Banks of First Deposit. Each X937 file is created utilizing proprietary Skyline Data system software created to meet the specifications set by the Federal Reserve Bank. Each X937 files is delivered to the Federal Reserve Bank via a secure transport method approved by the Federal Reserve Bank.

Checks eligible for ACH are processed via the ACH windows at the Federal Reserve Bank. Checks processed via ACH are sent to the Federal Reserve Bank via secure transport. One or more ACH files are created as required. Each ACH file is created and delivered via secure transport to a specific branch of the Federal Reserve Bank. The rules engine is used to determine which branch of the Federal Reserve Bank to deliver a check to. The routing number of the BOFD is used for this determination. Each ACH file for a specific Reserve Bank branch is composed of one or more batches. The rules engine determines the number of batches in an ACH file based upon analysis of the BOFD. The format of each batch (e.g., POP, ARC, etc.) is determined by the rules engine, based upon the terminal and batch from which the check was received. Each ACH file is created utilizing proprietary (Skyline Data) software created to meet the specifications set by the Federal Reserve Bank. Each ACH file is delivered to the Federal Reserve Bank via a secure transport method approved by the Federal Reserve Bank.

As stated and briefly described hereinabove, multiple sets of reports are generated by the DirectFed™ reporting system. Reports are created for delivery to a merchant, a merchant's BOFD and/or a community bank's processor. These reports detail the individual checks deposited on behalf of the bank, as well as the account into which the funds should be disbursed. This allows the individual banks to reconcile the net deposits they receive from the Federal Reserve Bank with the individual accounts to which the deposits are to be credited. Reports are created for Check 21 deposits. These reports can be in the (Skyline Data) customized format, X937 format, or other formats as requested by the bank or their processor. Reports are created for ACH deposits. These reports can be in the (Skyline Data) system-customized format, X937 format, or other formats as requested by the financial institution or their processor. Reports are created for delivery to the various merchants. These reports detail the individual checks deposited, from which location they were received, and into the particular financial institution and account into which they were deposited. Reports are created for Check 21 deposits. These reports can be in the (Skyline Data) system custom format, X937 format, or other formats as requested by the merchant. Reports are created for ACH deposits. These reports can be in the (Skyline Data) system custom format, X937 format, or other formats as requested by the merchant.

The preferred system architecture can incorporate Microsoft Windows XP as the operating system at the DirectFed™ merchant client.

The DirectFed™ merchant client provides for alternate methods of scanning, recognition, and verification of batches. This allows for the integration of the DirectFed™ client with other programs which can provide check images and data. Specifications are provided for generation of import data. The following steps can be replaced by the import of images and data from outside programs.

In lieu of scanning the images, the images and MICR information can be imported as a concluded batch. This batch is then treated as if the DirectFed™ merchant client scanned it, and is subsequently processed by the DirectFed™ recognition engine.

In lieu of scanning and recognition, the images, MICR information, and recognition data can also be imported as a recognized batch. This batch is then treated as if it was recognized by the DirectFed™ client and is then ready to be verified by the operator.

In lieu of the scanning, recognition and verification steps, the images, MICR information and verified data can be imported as a verified batch. This batch is then treated as if it was verified by the DirectFed™ client and is then ready to be uploaded.

The DirectFed™ client can provide for alternate methods of uploading. Instead of transmitting checks to the (Skyline Data) system for delivery/routing to the Federal Reserve Bank, the images and data can be uploaded to an alternate third party destination chosen by the client. An alternate method of upload can also be provided as required. This allows a merchant to continue clearing their checks by the existing method, while substituting the physical delivery of the checks with electronic delivery. An example might be a credit union, which clears through its corporate credit union. This is currently done by initially physically delivering the checks to the corporate location. The DirectFed™ system can be utilized to electronically deliver the checks to the corporate location saving both time and transportation costs.

As an alternative, any system can be used which can provide images and verified check information and upload them to the DirectFed™ Clearing system in a form known to the clearing system. The heart of the DirectFed™ system is the Clearing engine which processes checks received from remote terminals and determines when, where and how to deliver to the Federal Reserve Bank.

For the purpose of further clarifying the system and method of the invention, the following two examples are provided:

Example 1

The first exemplary application illustrates a scenario in which a merchant desires, or is required, to have all checks processed in accordance with Check 21. Using the DirectFed™ Client software, the merchant defines a bank account for the checks to be deposited into. The definition includes a description name, the bank routing number, the account number, and the information to be electronically added to the image of the back of each check.

Step 1: The merchant defines a profile under which the checks are to be scanned. This profile contains a reference to the bank account listed above, as well as other data including maximum number of checks in a batch, maximum amount of any individual check, maximum total amount of all the checks in the batch, the endorsement text to be physically printed on the back of processed checks, as well as other information relevant to processing the checks at the remote site.

Step 2: A merchant operator locally opens a new batch for scanning by selecting a profile and loading checks in an attached scanner.

Step 3: The scanner processes each check, including the printed endorsement on the back of each check, reading the magnetic MICR line, and providing an image of the front and back of the each check. This information is stored on disk and the process continues until the operator determines there are no more checks to scan, or the maximum number of checks in the batch, as defined in the profile, has been reached. At that time the operator can review each check and, optionally, can remove and rescan checks having potentially inadequate or poor quality images, or rotate checks scanned, for example, in an upside-down orientation. When the operator is satisfied, the batch is concluded, whereupon the images are stored in the local client image repository and the information about the batch and each check is recorded in the local client database. When the scanner captures an image of an item, a security hash value is simultaneously created and stored along with it. This hash value is used to ensure the integrity of the image and prevent any attempts to alter it from the instant it is captured by the scanner and stored on the hard drive of the client PC, until it is packaged and uploaded to the Skyline Data DirectFed™ clearing system.

Step 4: Upon conclusion of the check batch, the recognition engine begins processing each check in the batch, performing OCR on the check. At the conclusion of the OCR, analysis is performed on the MICR line and OCR provided data. The data result set of the this processing includes the Payor bank routing number, Payor bank account number, check amount, check number, and values representing the confidence level of each result.

Step 5: Upon conclusion of the recognition engine processing, the operator can choose a batch to verify. During the verification process, the operator is shown the image of a check and the four values read from the check. Next to each value is a visual, colored indication (green, yellow, or red) representing confidence levels. Green indicates that there is a high degree of confidence in the data, yellow indicates moderate confidence in the resulting data value, and red indicates low confidence in the data value. The operator is forced to review and manually correct items based on their respective confidence level coupled with the aforementioned examination rigor profile setting. After reviewing, and correcting as necessary, each item, the operator marks the batch as being verified.

Step 6: Upon conclusion of the verification process, the batch is ready to be uploaded to the Skyline Data clearing system, or a system at an alternate third party location. The operator can choose when to upload a batch. When the operator initiates the upload of a batch, the images, data from the check, data from the profile, and data from the bank account are packaged and transmitted to Skyline Data (or the third party) via a secure, encrypted web file transfer service.

Step 7: Immediately upon conclusion of the upload process, the images stored in the local client image repository, and sensitive data such as the payor bank routing number and account number for each check stored in the database, are encrypted. Without knowledge of the specific decryption method and keys, the images and data cannot be read outside of the DirectFed™ client program. This provides security for the images and accompanying sensitive data that is stored on the client computer.

Step 8: Once the DirectFed™ clearing system receives the packaged images and data, the file transfer stream having been encrypted and subsequently decrypted by the file transfer service, the data is unpackaged. The images are stored on disk and the data loaded into the DirectFed™ database repository.

Step 9: The rules engine component of the DirectFed™ clearing system periodically reviews all the checks in the database and determines when and how to process each check as well as where to deliver it. The merchant has directed the checks in this example batch to Check 21, so they are grouped with checks from other batches and terminals that will be processed via Check 21. The rules engine further separates the checks by the deposit to bank routing number, which determines to which Federal Reserve Bank branch the checks are to be delivered.

Step 10: Subsequently, the rules engine creates an X937 file for delivery to the relevant Federal Reserve Bank branch. This file contains one or more cash letters; each cash letter representing a routing number and possibly containing checks from multiple merchants, terminals and batches.

Step 11: Upon creation of an X937 file, the file is delivered to the relevant Federal Reserve Bank branch via a secure means of transmission approved by the Federal Reserve Bank. Upon completion of the transmission a message is received from the Federal Reserve Bank indicating acceptance of the file Step 12: Upon acceptance of the X937 file by the Federal Reserve Bank, further processing of the checks is performed by the Federal Reserve Bank. The Federal Reserve Bank performs a net settlement of funds to the BOFDs.

Step 13: The DirectFed™ reporting system generates a report (in Skyline Data proprietary format) for transmission/delivery to the BOFDs. This report provides the total deposit to the bank, subtotals by deposit to account number, subtotals by merchant, subtotals by merchant location, as well as detailed information from each check deposited. Additional reports can be generated in X937 or other formats for the use of the banks processor.

Step 14: The DirectFed™ reporting system generates a report (in Skyline Data proprietary format) for delivery to the merchant. This report gives the total deposit of the merchant, subtotals by bank, subtotals by account number, subtotals by merchant location, as well as detailed information from each check deposited.

Example 2

The second exemplary application illustrates a scenario in which a merchant desires to have all checks processed by a least cost method. Using the DirectFed™ Client software, the merchant defines a bank account for the checks to be deposited into. The definition includes a description name, the bank routing number, the account number, and the information to be electronically added to the image of the back of each check.

In this exemplary scenario, steps (1)-(9) are the same as described above with regard to Example 1. The subsequent steps are as follows:

Step 10: The rules engine of the DirectFed™ clearing system periodically reviews all the checks in the database and determines when and how to process each check, as well as where to deliver it. The checks in this example batch have been directed to least cost processing by the merchant, so the rules engine will determine which checks in the batch are eligible for ACH (the least cost delivery solution).

Step 11: The rules engine reviews which terminal checks have been received from, and whether checks from that terminal are eligible for ACH. In this example, we assume that the terminal(s) from which the checks were received is/are eligible for ACH processing.

Step 12: If the terminal from which the batch is received is eligible for ACH, batch information transmitted from the client terminal determines whether the specific batch of checks is eligible for ACH. In this example, the profile that was used to scan this batch of checks specifies that the batch is ACH eligible.

Step 13: When a check from an ACH eligible terminal and ACH eligible batch is received, the rules engine utilizes the MICR line, Payor bank routing number, Payor bank account number, check number and a (Skyline Data proprietary) ACH exclusion data table, to determine whether an individual check is ACH eligible. The Payor bank routing number and Payor bank account number are used to determine whether specific banks or bank/routing number combinations are not ACH eligible. The MICR line and check number are used to determine whether the check is a commercial check or a personal check. Commercial checks are not ACH eligible.

Step 14: Those checks not eligible for ACH are processed for Check 21, as described hereinabove in Example 1, Steps 5-14.

Step 15: Those checks eligible for ACH are grouped with checks from other batches and terminals which will be processed via ACH. The rules engine further separates the checks by the deposit to bank routing number, which determines the Federal Reserve Bank branch to which the checks are to be delivered.

Step 16: The rules engine then creates an ACH file for delivery to the relevant Federal Reserve Bank branch. This file contains one or more batches, each representing a routing number and ACH type (POP, ARC, etc.) and, potentially, containing checks from multiple merchants, terminals and batches.

Step 17: Upon creation of an ACH file, the file is delivered to the relevant Federal Reserve Bank branch via a secure transmission approved by the Federal Reserve Bank. Upon completion of the transmission, a message is received from the Federal Reserve Bank indicating the acceptance of the file.

Step 18: Upon acceptance of the ACH file by the Federal Reserve Bank further processing of the checks is performed by the Federal Reserve Bank. The Federal Reserve Bank performs a net settlement of funds to the BOFDs.

Step 19: The DirectFed™ reporting system generates a report (in Skyline Data proprietary format) for delivery to the BOFDs. This report provides the total deposit to the bank, subtotals by deposit to account number, subtotals by merchant, subtotals by merchant location, as well as detailed information relating to each check deposited. Additional reports can be generated in X937, ACH or other formats, for the use of the banks processor.

Step 20: The DirectFed™ reporting system generates a report (in Skyline Data proprietary format) for delivery to the merchant. This report provides the total deposit of the merchant, subtotals by bank, subtotals by account number, subtotals by merchant location, as well as detailed information for each check deposited.

Applicant's client software runs on a personal computer (PC) using the Microsoft Windows XP Operating system. The client software suite requires two available USB ports on the PC, into which a scanner and a software key are placed. As described hereinabove, the client software can be used either on a standalone PC or on a client's network, utilizing a common database and image repository. The network version allows for a sophisticated workflow design, where each PC on the network can be configured in such a way so as to perform all tasks associated with the Client software, or a subset of those tasks.

The Client utilizes several toolkits and processes to perform its tasks. The client can utilize the following commercially available hardware and software: image recognition software such as that developed by A2iA, Inc. of New York, N.Y.; tools for image manipulation such as that commercially available from Lead Technologies of Charlotte, N.C.; scanner control and interface software, such as that commercially available from Silver Bullet, Inc. of Pensacola, Fla.; application development software commercially available from Microsoft Corporation of Redmond, Wash.; Microsoft Web Services and Fileup EE available from SoftArtisans, Inc.; database systems such as SQL Server or Microsoft SQL Server Desktop Edition, commercially available from Microsoft Corporation; and Microsoft Windows XP operating system.

The processes used to set up the client are as follows: (1) define users and the tasks allowed; (2) define bank accounts, including electronic and hardcopy endorsements; (3) define profiles, including, bank account; data verification method; maximum value of items; including dollar amount per item and per batch of items; (4) maximum number of items per batch; and (5) defining coupon layout, including zones to be recognized.

Once set-up is complete, the Client allows several other processes to be run either in sequence on the same machine, or remotely on various machines, depending upon the configuration files.

The scanning module allows check and coupon documents to be scanned front side and back side, and allows for a customized physical endorsement to be placed upon an item, subject to the limitations of the scanner transport device. The module allows movement between items in the "batch to view" and/or "remove items" mode as required. It also allows scanning in single item and batch modes, and allows for saving of the entire state of an opened batch for subsequent resumption of scanning, or for concluding the scanning of a particular batch. Therefore, batches that are exited without concluding can simply be reopened to allow additional items to be scanned into the batch at a later time.

The scan process entails placing one or more checks or check/stub units of work into the attached scanner. The initiation of the scanning process begins to feed strictly checks, or a combination of checks and payment coupons, through the transport, where images and MICR information are captured and displayed on the computer screen for verification and possible removal and rescanning, as previously described in detail hereinabove. It is at this time that any physical endorsement of the item occurs. Scanning of the associated coupon(s) and recognition of the account identification allows the payments to be posted to the Payor(s) account(s) absent, or with limited, human intervention. This process utilizes proprietary code developed by the present applicant. It also uses scanner interface software, licensed from Silver Bullet, Inc., which allows the scanner software programs to interface with a variety of scanning transports, ranging from small desktop scanners to multi-pocket transports capable of processing hundreds of items per minute.

The process also utilizes the Lead Tools raster imaging toolkit, licensed from Lead Technologies, Inc. to provide sophisticated graphic image manipulation and display.

Upon conclusion of the batch, processed images are saved on disk and MICR and other information gathered from the items are stored within a Microsoft SQL database. This disk storage can be configured to remain either on the local machine or can be placed within a shared repository at the client site.

A separate Import program can be substituted for the scanning process. This process allows images and MICR data to be imported from third party system software, other than the DirectFed™ software. Applicant-developed documentation describes the location, specifications for the images, and XML data definitions for the MICR line and other required information.

Upon successful conclusion of either a scanned or imported batch, another process is triggered which performs OCR and Parsing of the MICR Line information. This process incorporates proprietary (Skyline Data) algorithms, in combination with commercially available check reader software, which is used in many of the world's largest financial institutions and has capabilities in many languages and currencies.

The result of this interpretation process is four values (i.e., check amount check number, account number, and bank routing number), and the confidence level information for each of the four values (i.e., highly confident, moderately confident and no confidence).

Based upon the confidence levels for each item, and values defined within the profile, a Correct and Verify program module displays various items on screen and allows the user to view and override values provided by the Recognition program module.

A separate Import program can also import data to be treated as having completed the recognition process. These items are then processed using the normal Correct and Verify program module. The specifications for input are published (from Skyline Data) with the documentation describing the location, specifications for the images, and XML data definitions for the MICR line and other required information.

Upon acceptance of the batch, following the Correct and Verify process, the batch is available for electronic packaging and transmission, or for review by other software processes and/or by supervisory personnel.

A copyright-protected specification document, detailing the process by which outside programs can review and provide external validation, is provided (published by Skyline Data). Upon conclusion of the verification process(es), the items in the batch are available for transmission to a predetermined destination.

Specifics of the packaging, transmission method and destination, are tailored to the client. Upon completion of the processing, the client can select a batch for uploading, at which point a batch will be transmitted to a host site for transmission of the data and images via a leased line, internet or internal intranet network.

Upon completion of the upload, the images are encrypted on the local disk and critical data within SQL server are also encrypted, using procedures built into the Microsoft .NET framework.

All items in any stage, from scanning to upload and encryption, are stored locally, either on a local PC or on the client's shared local repository. The images and data are always available for reporting, review and export to accounting systems, customer retention systems, and the like. While the images and data are encrypted, the retrieval program allows for on demand decryption of data and longtime storage, archive and retrieval, at the client site.

One of the transmission methods available to the client is transmission to the Skyline Data Facility, where images and data are received, processed and packaged for delivery to a clearing agent, i.e. the Federal Reserve Bank.

Depending upon the client configuration, and whether the check item is a personal or other item eligible for electronic processing via ACH, the item may be packaged for delivery to the Federal Reserve Bank, the customer's personal bank, an ACH clearinghouse or directly to the Payor bank.

The Skyline Data system is configured to reformat data and images received into formats accepted by the relevant clearing agents. Depending upon the clearing agent, all further transactions occur between the client and the financial institution, or the client and the Skyline Data system. In instances where there is further communication between the clearing agent and Skyline Data, this information is processed and made available to the client via website, various exports and reports. This information may also take the form of return of an item, request for and adjustment on the item, and receipt of other items.

A separate web interface is provided for banks, enabling them to initiate an adjustment and respond to an incoming adjustment or return. The (Skyline Data) system also provides various reports to the bank via website and other various processes. These reports provide summary and detailed information so that the bank can credit the associated accounts for the amount of the deposited items.

As a supplement to providing data and images to clearing agents, applicant's system (Skyline Data) can also provide images and data to the BOFDs. This allows the banks or their processors to provide information to the customer, and allows them to house archive and adjust information within their existing audit systems.

Significantly, in a further aspect of the invention, item capture and processing may include one or more associated payment coupons. The DirectFed™ Deposit client application is designed to process batches of items that comprise a mixture of paper checks and paper payment coupons that accompany the checks. The image capture module, or scanning module, is specially designed to scan and process the checks and coupons in an interleaved fashion in the same order or sequence that they would be obtained by physically opening a series of envelopes received from a Payor. Special logic is incorporated in the capture module to allow the interleaved stream of checks and payment coupons to be associated together correctly, without the use of separator pages or other artificial means. Logically assigning and maintaining an envelope sequence number to each item, either check or coupon, in the batch accomplishes this. Thus, the interleaved checks and coupons from multiple envelopes can be loaded together, for example, into an input hopper of a scanner. A single envelope may contain a certain maximum number items comprised of any combination of checks and coupons.

By logically associating check and coupon items in a logical envelope, the envelope contents may be inspected and organized by the operator after scanning has occurred. A special screen is available directly from the capture module to display thumbnail-sized images of the checks and coupons pictorially, organized into envelopes in a graphical fashion, wherein one envelope is represented on the upper half of the display, and the next envelope in sequence is shown in the lower half of the display. Items (i.e., checks and/or coupons) may be easily "moved" between the two envelopes, using a simple drag-and-drop operation. This permits an operator to easily correct input hopper loading errors, or paper jam errors, which may cause the system to erroneously associate, or "place," an item into the wrong logical envelope.

Following the scanning procedure, the checks and coupons are processed by OCR to extract the relevant information. In the case of coupons, the information to be extracted depends on the content and layout of the particular payment coupon in use, which typically varies greatly by billing organization. The DirectFed™ client application incorporates a sophisticated coupon definition module which allows the administrator/user to scan in a sample coupon, using the same scanner used for item processing, so that it may be displayed on the definition module screen. At that point, the administrator/user, using a computer mouse or the like, can indicate, in a "what you see is what you get," or WYSIWYG, fashion, particular areas of the coupon that contain information written or marked by the customer/payor that is desired to be extracted and retained. These coupon areas, or "data fields," are further characterized by the operator, while defining a coupon, by the nature of the data (e.g. hand-printed amount, account number, a checkbox, etc.). The physical location, size and data type, of each such content area on the coupon is then used to drive the OCR process in a zoned manner, focusing directly on each data field region, and tuned or optimized according to the nature of the data in each respective data field.

The data extracted from the coupons is loaded into the client DirectFed™Deposit database, along with the information extracted from the check items. Separate modules, one for checks and one for coupons, are employed to implement verifications and allow manual corrections to the recognized data. In the module dedicated to verify and correct coupon data, the coupon images are presented, one at a time, to the operator performing verification/correction. Rectangular borders are provided superimposed on the coupon image, indicating each of the data field regions as defined. The borders are individually color coded to represent the confidence level reported back by the OCR engine, as to the accuracy rendered for that particular data field. A green-colored border represents high confidence in OCR accuracy; a yellow-colored border represents a moderate confidence, and a red-colored border indicates a low confidence level. In this manner, the operator can quickly direct attention to any moderate or low confidence data fields for examination and correction. When the computer mouse, or other pointer mechanism, is hovered over a data field, the OCR recognized value is displayed in a special window along with an entry box for the operator to type a corrected value. A single mouse click copies the recognized value into the corrected value entry box, allowing easy and rapid correction in instances where the recognized value is actually correct, or only a few characters are incorrect. The corrected coupon field data is then loaded into the client database.

Following verification and correction of the extracted coupon data, the data is available for packaging and transmission to the user organization's accounting or accounts receivable data processing application. Each such user organization is expected to employ a unique accounting system with special needs and business considerations. Therefore the transmittal of coupon data out of the DirectFed™client application is preferably customized by the operators of the Skyline Data system of the present invention, as required, and supplied as an interface module. Many different modes of transport, such as XML data files, comma-delimited text files, spreadsheets, and databases such as MS Access or FoxPro are all available for use with the system and process of the invention.

Since many modifications, variations, and changes in detail can be made to the described preferred embodiments of the invention, it is intended that all matters in the foregoing description and shown in the accompanying drawing figure(s) be interpreted as illustrative and not in a limiting sense. Thus, the scope of the invention should be determined by the appended claims and their legal equivalence.

What is claimed is:

1. A system for decentralized batch processing of paper checking documents at a remote client location to enable direct routing of checking document information, in a format compliant with the Check Clearing for the 21$^{st}$ Century Act (Check 21), to a Federal Reserve bank, bypassing Bank of First Deposit operations, the system comprising:

a first subsystem configured for receiving electronically transmitted digital data files created from said paper checking documents, the first subsystem including a rules engine capable of automatically determining, without any human intervention, whether individual checking documents represented by said digital data files are properly formatted for processing in accordance with Check 21 standards to enable direct transmission of said digital data files to said Federal Reserve Bank; and a second subsystem at said client location, in secure communication with said first subsystem, configured for receiving checking document data, converting the checking document data into a format in conformance with Check 21 processing requirements, and securely transmitting said formatted data to said first subsystem for direct routing to said Federal Reserve bank.

2. A system as recited in claim 1, wherein said client location further comprises a non-bank entity.

3. A system as recited in claim 1, wherein said first subsystem is configured to analyze check data received from said second subsystem, in a manner enabling determination at said as to whether said formatted check information should be processed in accordance with an Automated Clearing House (ACH) procedure or in accordance with Check 21 procedure.

4. A system as recited in claim 3, wherein said first subsystem is configured to analyze check data received from said second subsystem, in a manner enabling determination as to where said check information should be routed.

5. A system as recited in claim 3, wherein said first subsystem is configured to enable reformatting of said received formatted data for processing in accordance with at least one of an ACH procedure or a Check 21 procedure.

6. A system as recited in claim 1, wherein said first subsystem is configured to analyze check data received from said second subsystem, in a manner enabling determination as to where said check information should be routed.

7. A system as recited in claim 1, wherein said second subsystem further comprises electronic storage means for locally archiving check related data and images.

8. A system as recited in claim 1, wherein said second subsystem further comprises:
optical character recognition (OCR) apparatus;
check scanning apparatus having a software scanning module running thereon to enable both sides of paper checks to be scanned, a magnetic ink character recognition (MICR) line to be read, and a customized physical endorsement to be printed thereon.

9. A system as recited in claim 8, wherein said second subsystem further comprises means for parsing said MICR line data to determine a check amount, a bank routing number, a bank account number, and a check number.

10. A system as recited in claim 1, wherein said second subsystem further comprises means for assigning quantitative confidence level indications to value date represented by said digital data files.

11. A system as recited in claim 10, wherein said quantitative confidence level indications further comprise color-coding.

12. A system as recited in claim 10, wherein second subsystem further comprises means for assigning a profile configuration value to automatically determine which of said value data requires manual inspection.

13. A computer-implemented method for decentralized processing of batch paper checking documents in accordance with the Check Clearing for the 21st Century Act (Check 21), comprising the steps of:
- providing a second subsystem configured for analyzing digital data files representing said paper checking documents;
- providing a first subsystem configured for securely electronically receiving said digital data files, the first subsystem including a rules engine capable of automatically determining, without requiring any human intervention, whether individual checking documents represented by said digital data files are properly formatted for processing in accordance with Check 21 standards to enable direct transmission of said digital data files to said Federal Reserve Bank;
- analyzing said digital data files at said second subsystem;
- transmitting said digital data files to said first subsystem from said second subsystem;
- receiving said digital data files at said first subsystem and exposing said digital data files to a rules engine running on said first subsystem, said rules engine automatically determining whether individual checking documents represented by said digital data files are properly formatted for processing in accordance with Check 21 standards to enable direct transmission of said digital data files to said Federal Reserve Bank;
- routing the received digital data files determined to be Check 21 compliant directly to said Federal Reserve Bank.

14. A method as recited in claim 13, wherein the step of providing a second subsystem configured for analyzing digital data files representing said paper checking documents further comprises providing Optical Character Recognition (OCR) apparatus and check scanning apparatus having a software scanning module running thereon to enable both sides of paper checks to be scanned, a magnetic ink character recognition (MICR) line to be read, and a customized physical endorsement to be printed thereon.

15. A method as recited in claim 14, further comprising, before the step of analyzing, the steps of:
- receiving said batch paper checking documents at said second subsystem;
- subjecting said documents to said check scanning apparatus;
- performing Optical Character Recognition (OCR) on said paper checking documents; and
- convening data from said scanned checks to digital data files.

16. A method as recited in claim 15, wherein the step of converting further comprises convening data from at least some of said scanned checks to digital data files in having a format in conformance with Check 21 processing requirements.

17. A method as recited in claim 16, further comprising the step of transmitting said digital data files to said first subsystem.

18. A method as recited in claim 17, further comprising the step of determining which of said digital data files are in conformance for processing in accordance Check 21 procedures.

19. A method as recited in claim 18, further comprising the step of securely routing said digital data files that conform with Check 21 procedures directly to said Federal Reserve bank.

20. A method as recited in claim 13, wherein said paper checking documents further comprise a combination of checking documents and payment coupon documents.

* * * * *